2,748,156

PRODUCTION OF ACRYLONITRILE

Rudolf Keller and Kurt Eder, Ludwigshafen (Rhine), Germany, assignors to Badische Anilin- & Soda-Fabrik Aktiengesellschaft, Ludwigshafen (Rhine), Germany No Drawing. Application March 16, 1953,
Serial No. 345,224

(Filed under Rule 47(a) and 35 U. S. C. 116)

Claims priority, application Germany March 14, 1952

4 Claims. (Cl. 260—465.3)

This invention relates to the production of acrylonitrile, and more particularly to a process for the catalytic production of acrylonitrile from hydrocyanic acid and acetylene.

It has already been proposed to prepare acrylonitrile by bringing together acetylene and hydrogen cyanide in aqueous solutions of catalysts which are capable of polymerizing acetylene, as for example aqueous solutions of copper-I-salts of strong acids and ammonium and/or alkali metal salts. It is also known that gas mixtures formed by the thermal or electrothermal cracking of methane or other gaseous hydrocarbons and which contain, besides acetylene, also hydrogen and other hydrocarbons, can be reacted by the same process to form acrylonitrile.

If, however, an attempt is made to react gas mixtures containing acetylene which contain large amounts of carbon monoxide and which are obtained for example by the incomplete combustion of methane or other gaseous hydrocarbons with oxygen, with hydrogen cyanide according to the said process, the activity of the catalysts falls off rapidly and the formation of acrylonitrile ceases entirely.

We have now found, contrary to expectation, that acrylonitrile can be prepared also from hydrogen cyanide and gas mixtures containing acetylene which contain a high proportion of carbon monoxide, by leading these substances through a solution which contains, besides a copper-I-salt of a strong acid, preferably a copper-I-halide, also a salt of a rare earth metal. The said catalyst solutions should preferably also contain free strong inorganic acids and as a solubilizer for the cuprous salts ammonium salts or amines and/or alkali metal salts. Metallic copper may also be added to the solution. As the solvent for the catalysts it is preferable to use water, but inert organic solvents, such as glycols, formamide, acetamide and the like can also be used.

The process may be carried out under normal or increased pressure and is especially suitable for the reaction of the dilute acetylene formed during the incomplete oxidation of methane, ethane or other saturated aliphatic gaseous hydrocarbons, or of gas mixtures containing such hydrocarbons, with oxygen. The gas mixtures containing acetylene thus formed contain as a rule from 5 to 10% of acetylene and from 10 to 40% of carbon monoxide besides a high proportion of hydrogen.

As examples of suitable salts of rare earth metals there may be mentioned cerium-III-chloride, cerium-III-nitrate, cerium-III-carbonate, cerium-III-phosphate, cerium-III-sulfate, cerium-III-acetate, cerium-III-oxalate, lanthanum chloride, lanthanum nitrate and lanthanum acetate, the amount of which relatively to the copper-salt can be extensively varied. In general about 0.5% to about 5% of the rare earth metal salts, with reference to the copper salt, are sufficient. Smaller or larger additions of these salts can, however, be used. The content of copper-I-salts should as a rule amount to 30 to 50% with reference to the total weight of the catalyst solution. The pH value of the catalyst solution is preferably adjusted to 0.2 to 4. The reaction is preferably carried out at 60° to 90° C., more preferably at temperatures which do not exceed 85° C. The activity of the new catalyst solutions is retained for long periods.

The following examples will further illustrate this invention but the invention is not limited to these examples.

Example 1

A vertically arranged tube having a capacity of 5 liters is charged with 4 liters of an aqueous catalyst solution having a pH value of about 2 containing per liter 550 grams of copper-I-chloride, 280 grams of ammonium chloride, 75 grams of sodium chloride, 5 grams of hydrochloric acid (30%) and 25.3 grams of cerium-III-chloride.

60 liters of a finely divided gas mixture of 7.2 parts by volume of acetylene, 55.6 parts by volume of hydrogen, 27.0 parts by volume of carbon monoxide, 3.8 parts by volume of carbon dioxide, 2.7 parts by volume of methane and 2.7 parts by volume of nitrogen are led in per hour at the lower end of the tube. At the same time 3.5 grams of hydrogen cyanide are supplied per hour. The acrylonitrile formed is withdrawn together with the unreacted constituents of the gas and the unconverted acetylene at the top end of the tube. The acrylonitrile is stripped from the gas mixture in the usual way, for example by washing out with water. From 1 mol of acetylene there are obtained 32 grams of acrylonitrile, corresponding to a yield of 60%.

The activity of the catalyst solution does not change in 350 operational hours. If, however, the same catalyst solution be used without the addition of a salt of a rare earth metal, the yield of acrylonitrile under the same conditions declines to 20 grams of acrylonitrile per mol of acetylene after 24 hours. After a further 48 hours the catalyst solution has become practically inactive.

Example 2

A vertically arranged tube having a capacity of 5 liters is charged with 4 liters of an aqueous catalyst solution containing per liter 570 grams of copper-I-chloride, 290 grams of ammonium chloride, 80 grams of sodium chloride, 5 grams of hydrochloric acid (30 per cent) and 21.5 grams of cerium-III-nitrate.

60 liters of a finely divided gas mixture of 7.8 parts by volume of acetylene, 54.8 parts by volume of hydrogen, 27.5 parts by volume of carbon monoxide, 3.6 parts by volume of carbon dioxide, 2.4 parts by volume of methane and 3.9 parts by volume of nitrogen are led in per hour at 85° C. at the lower end of the tube. At the same time 3.5 grams of hydrogen cyanide are added per hour. The acrylonitrile formed is withdrawn together with the unreactive constituents of the gas and the unreacted acetylene at the top end of the tube. The acrylonitrile is stripped from the gas mixture in the usual way, for example by washing out with water. From 1 mol of acetylene there are obtained 31.5 grams of arcylonitrile, corresponding to a yield of 59%.

Example 3

4 liters of an aqueous catalyst solution containing per liter 500 grams of copper-I-chloride, 40 grams of lanthanum acetate, 300 grams of ammonium chloride, 75 grams of sodium chloride and 5 grams of hydrochloric acid of 30 per cent strength are charged in a flask and, while stirring the solution vigorously at 85° C., 60 liters of a gas mixture that consists of 7.2 parts by volume of acetylene, 55.6 parts by volume of hydrogen, 27.0 parts by volume of carbon monoxide, 3.8 parts by volume of carbon dioxide, 2.7 parts by volume of methane, and 3.7 parts by volume of nitrogen are passed through and 3.5 grams of hydrogen cyanide simultaneously added. The yield of acrylonitrile is 33.5 grams for one mol of acetylene, which amounts to about 63 per cent with reference to acetylene and about 94.5 per cent with reference to hydrocyanic acid. The acrylonitrile can be stripped in the conventional manner.

What we claim is:

1. A process of producing acrylonitrile which comprises reacting hydrocyanic acid with a gas mixture containing from 5 to 10% by volume of acetylene and from 10 to 40% by volume of carbon monoxide obtained by the incomplete combustion of saturated gaseous aliphatic hydrocarbons in a solution heated at a temperature from 60° to 90° C. of a cuprous salt as a catalyst and a solubilizer therefor, the catalyst solution containing also a compound selected from the class consisting of a cerium-III-salt and a lanthanum salt and being adjusted by the addition of a strong acid to a pH-value from 0.2 to 4.

2. The process as claimed in claim 1 wherein the catalyst solution contains from 30 to 40% by weight of cuprous halide and from 0.5 to 1.5% by weight of cerium-III-salt.

3. A process of producing acrylonitrile which comprises reacting hydrocyanic acid with a gas mixture obtained by the incomplete oxidation of gaseous saturated aliphatic hydrocarbons containing from 5 to 10% by volume of acetylene and from 10 to 40% by volume of carbon monoxide in a solution heated to a temperature from 60° to 90° C. of cuprous chloride as a catalyst and a solubilizer therefor, the catalyst solution containing from 40 to 50% by weight of cuprous chloride and from 0.5 to 1.5% by weight of cerium-III-chloride, this solution being adjusted by the addition of a strong acid to a pH-value from 0.2 to 4.

4. A process of producing acrylonitrile which comprises reacting hydrocyanic acid with a gas mixture obtained by the incomplete oxidation of gaseous saturated aliphatic hydrocarbons containing from 5 to 10% by volume of acetylene and from 10 to 40% by volume of carbon monoxide in a solution heated to a temperature from 60° to 90° C. of cuprous chloride as a catalyst and a solubilizer therefor, the catalyst solution containing from 40 to 50% by weight of cuprous chloride and from 0.5 to 1.5% by weight of cerium-III-nitrate, this solution being adjusted by the addition of a strong acid to a pH-value from 0.2 to 4.

References Cited in the file of this patent

UNITED STATES PATENTS

| | | |
|---|---|---|
| 2,385,469 | Salley | Sept. 25, 1945 |
| 2,417,068 | Farlow et al. | Mar. 11, 1947 |
| 2,476,771 | Salzberg | July 19, 1949 |